United States Patent [19]

Fujii et al.

[11] Patent Number: 4,755,434

[45] Date of Patent: Jul. 5, 1988

[54] PROCESS FOR COATING METALLIC SUBSTRATE

[75] Inventors: Yasuhiro Fujii; Osamu Iwase; Hirosi Oosumimoto; Shinji Sugiura; Ichiro Tabushi; Takashi Udagawa; Masafumi Kume; Komaharu Matsui, all of Hiratsuka, Japan

[73] Assignee: Kansai Paint Co., Ltd., Hyogo, Japan

[21] Appl. No.: 805,382

[22] Filed: Dec. 4, 1985

[30] Foreign Application Priority Data

| | | | |
|---|---|---|---|
| Dec. 7, 1984 | [JP] | Japan | 59-258538 |
| Dec. 7, 1984 | [JP] | Japan | 59-258539 |
| Dec. 11, 1984 | [JP] | Japan | 59-261219 |
| Dec. 14, 1984 | [JP] | Japan | 59-265049 |
| Dec. 14, 1984 | [JP] | Japan | 59-265050 |
| Dec. 14, 1984 | [JP] | Japan | 59-265051 |

[51] Int. Cl.[4] ...................... B32B 15/08; C25D 13/00; B05D 3/02

[52] U.S. Cl. ................................ 428/461; 204/181.3; 427/27; 427/195; 427/202; 427/407.1; 427/409

[58] Field of Search .............. 427/27, 195, 202, 407.1, 427/407; 428/461; 204/180.2, 181.1, 181.3, 14.1, 23, 29

[56] References Cited

U.S. PATENT DOCUMENTS

| | | | |
|---|---|---|---|
| 3,922,473 | 11/1975 | Kosaka et al. | 427/409 X |
| 3,998,716 | 12/1976 | Masar et al. | 204/181.1 |
| 4,139,672 | 2/1979 | Ozawa et al. | 427/202 X |
| 4,175,018 | 11/1979 | Gacesa | 204/181.1 |
| 4,259,163 | 3/1981 | Suzuki et al. | 204/181.1 |
| 4,312,902 | 1/1982 | Murase | 427/386 |
| 4,358,508 | 11/1982 | Tanaka et al. | 427/195 X |
| 4,370,190 | 1/1983 | Ichinose et al. | 427/409 X |
| 4,481,239 | 11/1984 | Eckner | 428/36 |

*Primary Examiner*—Thurman K. Page
*Attorney, Agent, or Firm*—Wenderoth, Lind & Ponack

[57] ABSTRACT

A process for coating a metallic substrate, characterized by applying on a metallic substrate a cation type electrocoating paint, applying thereon a barrier coat comprising a modified polyolefin resin and capable of forming a barrier coat film having a static glass transition temperature of 0° to −60° C. and a corrosion-preventive pigment, optionally applying on said barrier coat an intermediate coating paint and then applying thereon a top coating paint.

30 Claims, No Drawings

PROCESS FOR COATING METALLIC SUBSTRATE

This invention relates to a process for coating a metallic substrate. More particularly, the present invention relates to a process for coating a metallic substrate such as, for example, a steel panel or the like constituting automotive bodies to form thereon a composite coating film excellent in chipping resistance, corrosion resistance, weather resistance and other physical properties.

Recently in the field of coating, there has come to be taken up more seriously the durability of the coating film on automotive outer bodies, particularly, the progress of corrosion of the metal materials of these outer bodies caused by the impact cracking of the coating film. For example, in the cold climatic areas of Europe and America, in order to prevent the surface freezing of roads for automobiles, there are often laid on the roads in winter pebbles mixed with a large quantity of rock salt ground to relatively coarse particles. In automobiles running on such roads, the coating film on their outer portions is hit by the rock salt particles and pebbles flipped by the wheels and this impact often causes an impact cracking phenomenon, namely, so-called "chipping" in which the coating film locally peels off the body completely. Owing to this phenemenon, the metal surface of the outer body beneath the hit areas of the coating film is exposed to an atmosphere leading to rapid formation of rust and progress of corrosion. The cracking of coating film due to chipping ordinarily appears more in the bottom and underbody but it appears even in the hood or the roof. It is known that the resulting local corrosion progresses to a considerable degree in about 6 months to one year.

In order to prevent the chipping of coating film and the resulting progress of corrosion of the metal substrate beneath the coating film, there have heretofore been made various investigations on the chemical treatment, electrocoating primer, intermediate coating paint, and top-coating paint to be applied to the surface of metallic substrate of automotive outer body. For example, with respect to the chemical treatment, there was investigated the formation of an iron phosphate type film and a zinc phosphate type film each of different crystal form, but such a chemical treatment cannot improve the adhesion of coating film to substrate metal to the level sufficient for resisting the impact of pebbles, etc. Also, with respect to the electrocoating paint and the top coating paint, various investigations were made on resins and/or pigments to be contained in these paints, but no electrocoating paint or top coating paint having an adhesion sufficiently resistant to chipping has been developed yet.

There was also investigated the use of sericite or talc powder which is a foil-shaped inorganic pigment, in the composition of an intermediate coating paint. This method is intended to buffer and/or dissipate the impact exerted on the coating film of automotive outer body, by a slipping action within the intermediate coating film due to the foil-shaped inorganic pigment, or to allow local peeling to occur only within the intermediate coating film or only at the interface between the electrocoating film and the intermediate coating film, and consequently to prevent the electrocoating film from being damaged so that the electrocoating film can maintain a sufficient rust-preventive function. However, this method has the following drawback. That is, since the impact applied to the outer surface of automotive body is various and is fairly large in some cases, when an impact exceeding the buffering or dissipating ability of the intermedaite coating film is exerted, the impact cannot be completely absorbed by the intermediate coating film and spreads to all the coating film including the electrocoating film and, as the result, all the coating films at the portions which have received the impact peel off the metallic substrate, whereby rust develops quickly and corrosion progresses at these metallic substrate portions.

Hence, the present inventors made an extensive study in order to improve the above-mentioned conventional drawbacks and to provide a process for coating a metallic substrate, particularly a steel panel to form thereon a multi-layered coating film excellent in chipping resistance, corrosion resistance, weather resistance and other physical properties and yet having a good film appearance as possessed by conventional coating systems for steel panels comprising an electrocoating paint, an intermediate coating paint which is optional, and a top coating paint. As the result, the present invention has been completed.

According to the present invention, there is provided a process for coating a metallic substrate, characterized by applying on a metallic substrate a cation type electrocoating paint, applying thereon a barrier coat comprising a modified polyolefin resin and a corrosion-preventive pigment, and capable of forming a barrier coat film having a static glass transition temperature of 0° to −60° C., optionally applying on said barrier coat an intermediate coating paint and then applying thereon a top coating paint.

An important characteristic of the present invention lies in that in a process for coating a metallic substrate, particularly a steel panel with a cation type electrocoating paint, an optional intermediate coating paint and a top coating paint in this order, a barrier coat having a particular composition and a particular property is applied after the electrocoating prior to the application of the optional intermediate coating paint or the top coating paint. Application of this barrier coat enables the formation of a composite coating film very excellent in chipping resistance, corrosion resistance, weather resistance and other physical properties.

The barrier coat film whose static glass transition temperature is adjusted to 0° to −60° C. and whose elongation at break at −20° C. is preferably adjusted to 100 to 1,000% is flexible as compared with the intermediate coating films, etc. conventionally used for improving chipping resistance and has a viscoelasticity inherently possessed by the modified polyolefin. Hence, even if the surface of the top coating film formed on or above the barrier coat film having the above-mentioned physical properties receives a strong impact of rock salt, pebbles, etc., the impact energy is mostly or completely absorbed within the barrier coat film and does not reach the electrocoating film beneath the barrier coat film and moreover even the top coating film and the optional intermediate coating film undergo little physical damage. That is, the barrier coat film has a buffer action for external impacts, whereby the chipping resistance of coating system has been remarkably improved, development of rust and corrosion on steel panels caused by chipping has been prevented and the deterioration of the top coating film due to collision of rock salt, pebbles, etc. has been solved.

Furthermore, because the barrier coat is caused to contain a corrosion-preventive pigment, the corrosion resistance of the formed composite film is drastically improved compared with the coating system in which the electrocoating as the primer alone contains the corrosion-preventive pigment.

The coating process according to the present invention will be described in detail below.

Metallic substrate

This is the material to be coated according to the present process. As the metallic substrate to which the present process is applicable, there can be used any materials having a metal surface to which cation electrocoating can be applied. Such materials include, for example, shaped articles made of iron, copper, aluminum, tin, zinc or alloys thereof as well as products having plated or deposited films of those metals or alloys. A steel panel is particularly preferred. Specifically, there are mentioned bodies and parts made of said materials, of passenger cars, trucks, safari cars, motorcycles, etc. It is preferable that the surfaces of these metallic substrates be subjected to a chemical treatment with a phosphate, a chromate or the like prior to the application thereon of a cation type electrocoating paint.

Cation type electrocoating paint

This is an electrocoating paint to be applied on the surface of the above metallic substrate. Any cation type electrocating paints hitherto known, for example, those described in literatures such as "Kobunshi Kako", Vol. 25, No. 11, pages 5 to 10 (1976) can be used.

Cation type electrocating paints include thermosetting electrocoating paints of cathodic deposition type wherein a base resin having basic amino groups is neutralized with an acid and dissolved (or dispersed) in water. These paints are coated on a metallic substrate using the substrate as a cathode.

As the resins having basic amino groups, there are suitably used resins generally having a base value of about 20 to about 200 obtained by, for example, (1) addition of an amine to epoxy groups (oxirane rings) of an epoxy group-containing resin such as a bisphenol type epoxy resin, an epoxy group-containing (or glycidyl group-containing) acrylic resin, a glycidyl ether of alkylene glycol, an epoxidized polybutadiene, an epoxidized novolak phenol resin or the like (2) polymerization using, as a monomer, an unsaturated compound having basic amino groups such as N,N-dimethylamino ethyl methacrylate, N,N-diethylaminoethyl acrylate, N-vinylpyrazole or the like, (3) reaction of a polyisocyanate compound with a glycol containing, as one component, a tertiary amino group-containing glycol (e.g. N-methyldiethanolamine) and (4) introduction of amino groups to a resin by an imidoamine formation reaction between an acid anhydride and a diamine.

As the amine used in the above reaction (1), there can be mentioned primary amines, secondary amines and tertiary amine salts of aliphatic type, alicyclic type and araliphatic type. Products obtained by adding to the epoxy group-containing resin mentioned in (1), a secondary sulfide salt or a tertiary phosphine salt in place of said amine can also be used in the present invention as a vehicle component of the cation type electrocoating paint.

As the neutralizing agent to neutralize the resin having basic amino groups to dissolve (or disperse) the resin in water, there can be used, for example, organic acids such as acetic acid, hydroxyacetic acid, propionic acid, butyric acid, lactic acid, glycine and the like as well as inorganic acids such as sulfuric acid, hydrochloric acid, phosphoric acid and the like. The appropriate amount of the neutralizing agent to the resin is about 0.1 to about 0.4 times the neutralization equivalent for the base value of the resin (generally about 20 to about 200).

As the crosslinking agent to be incorporated into the cation type electrocoating paint to make it thermosetting, there is generally used a blocked polyisocyanate compound. When the electrocoating film so formed is heated (ordinarily to 140° C. or higher), the crosslinking agent causes dissociation, whereby the isocyanate groups are regenerated and cause a crosslinking reaction with active hydrogen-containing functional groups (e.g. hydroxyl group) present in the cation type resin as above and curing of the film.

Into the cation type electrocoating paint usable in the present invention are further incorporated, if necessary, pigments, hydrophilic organic solvents (e.g. isopropanol, n-butanol, ethoxyethanol, diethylene glycol monomethyl ether, diethylene glycol monoethyl ether, diethylene glycol monobutyl ether) and ordinarily used additives. The resulting mixture is adjusted with a deionized water so as to have a solid content of about 5 to about 40% by weight and its pH is kept at 5.5 to 8.0.

The cation type electrocoating paint thus prepared is subjected to cation electrocoating. It is usually conducted under conditions of 15° to 35° C. (bath temperature) and 100 to 400 V (load voltage) using the metallic substrate as the cathode. The electrocoating film thickness is not particularly restricted and can vary largely depending upon the intended application of finished product, etc. However, the thickness is preferred to be generally 10 to 40μ, particularly 15 to 40μ in terms of cured film thickness of flat portions. Generally suitable baking and curing temperature of the coating film ranges 100° to 210° C. generally.

In the preparation of the cation type electrocoating paint, conventionally pigments have normally been used, in order not to reduce the smoothness of coating film, in an amount less than 40 parts by weight, ordinarily 35 parts by weight or less based on 100 parts by weight of resin solid. In the present invention, too, pigments can be used in the cation type electrocoating paint in the above amount. However, it was found in the present invention that use of pigments in the electrocoating paint in an amount of 40 parts by weight or more based on 100 parts by weight of resin solid can give a final coated product whose metallic substrate (especially, its acute-angled portions) is further improved in corrosion resistance and chipping resistance.

Metallic substrates, particularly automotive bodies contain many acute-angled portions of steel panel such as side, bottom and inside of facia, fender, door panel, panel hood, panel roof, panel trunk lid and body. Unlike other flat portions, these acute-angled portions have an acute-angled or projected shape. At such portions, paints do not adhere sufficiently and, once adhered, melt-flow during heat curing. Therefore, it has been inevitable that the film thickness gets thinner at the acute-angled portions as compared with that of flat portions and, especially at very acute-angled portions, the film thickness becomes extremely thin. As a result, the acute-angled portions have far inferior corrosion resistance than the flat portions and rust tends to easily appear first in the acute-angled portions. In contrast, when the present process is carried out using a cation type electrocoating paint containing pigments at high concentrations, the electrocoating paint adheres sufficiently even to the acute-angled portions and fine uneven portions present on the surface of the electrocoating film are filled by a barrier coat (to be described later), whereby the penetration of an intermediate coating paint or a top coating paint can be prevented and a coating system having improved surface smoothness, distinctness of image gloss, corrosion resistance of acute-angled portions, etc. can be obtained.

The amount of pigment incorporated in the cation type electrocoating paint in order to obtain such a coating system is more than that in normal cases, more specifically 40 to 150 parts by weight, preferably 55 to 100 parts by weight, more preferably 60 to 85 parts by weight, based on 100 parts by weight of resin solid. Needless to say, there can also be used in the present invention an amount less than 40 parts by weight, ordinarily 35 parts by weight or less based on 100 parts by weight of resin solid which hitherto has been used generally. The pigments usable in the cation type electrocoating paint are not particularly restricted in type and include color pigments, extender pigments, rust preventive pigments, etc. which are known per se. As such pigments, there can be mentioned, for example, zinc oxide, antimony white, basic lead sulfate, basic lead carbonate, titanium dioxide, lithopone, lead silicate, zirconium oxide, carbon black, graphite, black iron oxide, aniline black, cuprous oxide, cadmium red, chrome vermilion, red iron oxide, pigment red, pigment violet, pigment orange, basic lead chromate, chrome yellow, ocher, cadmium yellow, strontium chromate, titanium yellow, litharge, pigment yellow, pigment green, zinc green, chrome green, chromium oxide, Phthalocyanine Green, ultramarine, prussian blue, Phthalocyanine Blue, pigment blud, cobalt violet, pigment violet, zinc powder, zinc oxide, red lead, lead cyanide, calcium plumbate, zinc yellow, silicon carbide, aluminum powder, asbestine, alumina, clay, diatomaceous earth, slaked lime, gypsum, talc, barium carbonate, precipitated calcium carbonate, calcium carbonate, precipitated barium sulfate, barite, bentonite, white carbon, glass beads, etc. These pigments can be used alone or in a combination of two or more.

Also for allowing the corrosion-preventive pigments to be incorporated into the later-described barrier coat to fully exhibit their corrosion-preventive function, water absorption of the electrocoating film is preferably adjusted in advance to 0.3–20% by weight, particularly 0.5–5% by weight.

The "water absorption" of the electrocoated film is the value calculated as follows: a cation type electrocoating paint is applied onto a substrate to a cured film thickness of 20μ (applied area: 5×5 cm), baked under the conditions suitable for the components therein, and the coating film is isolated. The film is immersed in warm water of 50° C. for 48 hours, and its weight immediately after withdrawal from the water and that after drying it at 105° C. for an hour are measured, which are inserted into the equation below:

$$\text{Water absorption of coating film} = \frac{\text{film weight immediately after withdrawal from warm water} - \text{film weight after drying}}{\text{film weight after drying}} \times 100$$

Adjustment of the water absorption of the cation type electrocoating film as above presumably facilitates the penetration of the water-extracted component of the corrosion-resistant pigment from the barrier coat containing said pigment into the electrocoating film, to fully exhibit its cathode-·(or anode-) inhibiting effect o the surface of metallic member and to protect the metallic member. The adjustment of water absorption can be easily effected by controlling the crosslinking density of the coating film, introduction of hydrophilic groups into the vehicle resin and the amount of blending extender pigment, or the like.

By incorporating such a corrosion-preventive pigment into the barrier coat, the use of the corrosion-preventive pigment in the cation type electrocoating paint can be omitted.

Barrier coat

This is a composition to be applied onto the cation type electrocoated surfaces. It is a coating composition composed mainly of a modified polyolefin resin and capable of forming a barrier coat film having a static glass transition temperature of 0° to −60° C., preferably −30° to −60° C., more preferably −40° to −55° C. The above "modified polyolefin resin" refers to a resin which is composed mainly of a polyolefin resin and wherein the resin is modified by a chemical reaction or is mixed with a modifying agent. The base polyolefin to be modified includes a homopolymer or copolymer of at least one member selected from ethylenic hydrocarbons represented by the general formula $C_nH_{2n}$ (n=2 to 10) such as ethylene, propylene, butene, pentene, heptene, octene and the like. The base polyolefin resin preferably has a number average molecular weight of 10,000 to 1,000,000, particularly 100,000 to 800,000.

As the modified polyolefin resin obtained by modifying a base polyolefin by a chemical reaction, there are, for example, the following resins.

(A-1) Resins obtained by graft-polymerizing maleic acid or maleic anhydride onto a base polyolefin resin. Particularly preferable among these is a resin obtained by graft-polymerizing 0.1 to 50 parts by weight, preferably 0.3 to 20 parts by weight of maleic acid or maleic anhydride to 100 parts by weight of a propylene-ethylene copolymer (the mole ratio of propylene:ethylene is ordinarily 40:60 to 80:20, preferably 50:50 to 70:30).

(A-2) Resins obtained by graft-polymerizing acrylic acid or methacrylic acid onto the chlorination product of a base polyolefin resin [e.g. a chlorinated polyolefin described in (B-1) which appears later]. Preferably, the amount of acrylic acid or methacrylic acid used is generally 0.1 to 50 parts by weight, particularly 1 to 30 parts by weight, based on 100 parts by weight of chlorinated polyolefin resin.

(A-3) Copolymers between (a) at least one member selected from the aforementioned ethylenic hydrocarbons and (b) at least one comonomer selected from vinyl acetate, acrylic acid and methacrylic acid. In these copolymers, the ratio of the two components is preferred to be such that the former component is 99 to 30% and the latter component is 1 to 70% based on the total weight of the two components. The appropriate number average molecular weight of these copolymers is 10,000 to 800,000.

As the modified polyolefin resin obtained by adding to a base polyolefin resin another component (a modifying agent), there are, for example, the following resins.

(B-1) Compositions obtained by adding to 100 parts by weight of a base polyolefin [preferably the same propyleneethylene copolymer as mentioned in (A-1)], 1 to 90 parts by weight, preferably 1 to 60 parts by weight, more preferably 10 to 40 parts by weight, of a chlorinated polyolefin (preferably a chlorinated polypropylene) having a chlorination degree generally of about 1 to 60%, preferably 20 to 40% and a number average molecular weight ordinarily of 10,000 to 1,000,000, particularly 100,000 to 500,000.

(B-2) Compositions obtained by adding to the base polyolefin resin an acrylic resin having a static glass transition temperature of 0° C. or lower, preferably −10° C. or lower and a number average molecular weight of 5,000 to 100,000, in the same proportion as in (B-1).

(B-3) Compositions obtained by adding to 100 parts by weight of the base polyolefin resin, 1 to 90 parts by weight, preferably 1 to 60 parts by weight, more preferably 10 to 40 parts by weight of a styrene-butadiene copolymer (preferably having a styrene:butadiene weight ratio of 1:99 to 50:50).

Of the above modified polyolefin resins, (A-1) and (B-1) are particularly preferred.

These modified polyolefin resins are preferred to have by themselves a static glass transition temperature of 0° to −60° C.; however, this is not essential. What is essential is that a coating film formed by the barrier coat has the above static glass transition temperature. Accordingly, even if a modified polyolefin resin used does not have itself the static glass transition temperature within said range, the resin can provide a barrier coat capable of forming a coating film having a static glass transition temperature of 0° to −60° C., by using the resin in combination with a modifier for static glass transition temperature. Such a modifier for static glass transition temperature includes thickeners. As thickeners usable in the present invention process, there can be mentioned those having a good compatibility with a modified polyolefin resin used, such as, for example, a rosin, a rosin ester, a hydrogenated rosin, a polyterpene resin, an ester gum, an epoxymodified polybutadiene, an aliphatic epoxy resin of low molecular weight, an aliphatic bisphenol type epoxy resin of low molecular weight, a polyoxytetramethylene glycol, a silicone rubber, a polyvinyl ethyl ether and a polyvinyl methyl ether. These thickeners preferably have a static glass transition temperature generally of +20° C. to −70° C. These thickeners can be added even to a modified polyolefin resin having a static glass transition temperature of 0° to −60° C. In this case, the coating film of the barrier coat obtained has a more desirable static glass transition temperature. The amount of the thickener to be used differs by the type thereof, the type of modified polyolefin resin used, the required physical properties of coating film formed, etc. and can not be strictly specified. However, the amount is generally 1 to 50 parts by weight, preferably 5 to 30 parts by weight based on 100 parts by weight of modified polyolefin resin.

The coating film formed by the barrier coat according to the present invention has a static glass transition temperature of 0° to −60° C., preferably −30° to −60° C., more preferably −40° to −55° C. In addition, the coating film desirably has an elongation at break ordinarily of 200 to 1,000%, preferably 300 to 800%, more preferably 400 to 800% in an atmosphere of −20° C.

"Static glass transition temperature" and "elongation at break" used in the present specification and the appended claims refer to the values obtained from the following measurement methods.

Test sample

A barrier coat was applied on a tin plate with the final film thickness of 25μ. Baking was conducted for 30 min. at 120° C., after which the coating film was isolated using an amalgam process. This film isolated was used as a test sample.

Measurment methods

For the above test sample, static glass transition temperature was measured using a differential scanning calorimeter (DSC-10 type manufactured by Daini Seikosha), elongation at break was measured at −20° C. using a universal tensile tester with constant temperature bath (Autograph S-D type manufactured by Shimadzu Corp.). In this measurement, the sample length was 20 mm and the tensile speed was 20 mm/min.

The modified polyolefin resin and if necessary the thickener are selected so as to give a barrier coat film having desired physical properties as mentioned previously.

The barrier coat composed mainly of a modified polyolefin resin can be prepared in a form of organic solvent type paint or water-borne type paint. The form of organic solvent type paint is preferable. Such a barrier coat of organic solvent type can be prepared by dissolving or dispersing a modified polyolefin and if necessary a modifier for static glass transition temperature in an organic solvent. As the organic solvent, there can be mentioned aromatic hydrocarbons such as benzene, toluene, xylene and the like; aliphatic hydrocarbons such as hexane, heptane, octane, decane and the like; chlorinated hydrocarbons such as trichloroethylene, perchloroethylene, dichloroethylene, dichloroethane, dichlorobenzene and the like.

When a powdery top coating paint is directly applied on the barrier coat film (an intermediate coating paint is not applied), it is preferable that the barrier coat contains, in addition to the above mentioned organic solvent, another organic solvent having a boiling point of 150° C. or higher and compatible with the top coating paint powder (hereinunder this organic solvent is referred to at times as "compatible solvent"), such as diisopropylbenzene, tetralin, decalin, o-dichlorobenzene, trichlorobenzene, benzyl alcohol, diisobutyl ketone, isophorone, cellosolve acetate, carbitol acetate, dimethyl phthalate or the like. Use of such a compatible solvent in combination with an organic solvent as mentioned above is preferable for the following reason. That is, when a barrier coat obtained by dissolving or dispersing a modified polyolefin resin in a mixed solvent consisting of an organic solvent and a compatible solvent is applied and subsequently a top coating paint powder is quickly applied on the still wet (not baked) barrier coat film and baked, the compatible solvent remaining in the barrier coat film evaporates and reaches the top coating powder film, whereby the resin powder is given an improved hot melt-flow characteristics and the smoothness of finished coating surface is remarkably improved. The amount of compatible solvent in mixed solvent is not critical, but preferably 5 to 50% by weight. The content of mixed solvent in barrier coat is appropriately 15 to 95% by weight. Thus, when a top coating paint powder is directly applied on a barrier coat film and an intermediate coating paint is not applied, by applying a top coating paint powder on a barrier coat film which is still wet and contains a compatible solvent, there can be effectively provided a finished coating surface having improved smoothness.

Into the barrier coat can be incorporated various additives as necessary. For example, there can be incorporated pigments mentioned with respect to the cation type electrocoating paint, such as color pigments, extender pigments and the like. The amount of pigments incorporated can be generally 150 parts by weight or less, preferably 100 parts by weight or less, based on 100 parts by weight of modified polyolefin resin.

Into the barrier coat can further be incorporated, for purposes of, for example, (1) improvement of physical properties of coating film, (2) improvement of dispersibility of pigments and (3) filling, proper amounts of known additives for coatings such as, for example, a resin, a resin ester, a hydrogenated resin, a polyterpene resin, an ester gum, an epoxy-modified polybutadiene, an aliphatic epoxy resin of low molecular weight, an aliphatic bisphenol type epoxy resin of low molecular weight, a polyoxytetramethylene glycol, a silicone rubber, a polyvinyl ethyl ether, a polyvinyl methyl ether, a pigment dispersing agent, a film surface improver and the like.

When the intermediate coating is omitted and a top coating paint is directly applied on the barrier coat film, it is preferable that the barrier coat further contains deterioration inhibitors for resins such as an ultraviolet absorber, a photostabilizer, an anti-oxidant and the like. The purpose of using such inhibitors is to absorb ultraviolet rays passing through the top coating film having a small hiding power and to prevent the oxidation of radicals generated in resin chains and thereby to protect the barrier coat film and the electrocoating film surface from being deteriorated with time by ultraviolet rays.

The ultraviolet absorber usable in the barrier coat can be any as long as it can absorb the energy of ultraviolet rays, is compatible with or uniformly dispersible in the modified polyolefin resin used in the barrier coat and does not easily decompose and lose its function at a temperature at which the barrier coat film or a whole coating system is baked. The usable ultraviolet absorber includes, for example, benzophenones such as benzophenone, 2,4-dihydroxybenzophenone, 2,2′4,4′-tetrahydroxybenzophenone, 2-hydroxy-4-methoxybenzophenone, 2,2′-dihydroxy-4,4′-dimethoxybenzophenone, 2,2′-dihydroxy-4-methoxybenzophenone, 2-hydroxy-4-octoxybenzophenone, 2-hydroxy-4-dodecyloxybenzophenone, 2-hydroxy-4-methoxy-5sulfobenzophenone, 5-chloro-2-hydroxybenzophenone, 2,2′-dihydroxy-4,4′-dimethoxy-5-sulfobenzophenone, 2-hydroxy-4-methoxy-2′-carboxybenzophenone, 2-hydroxy-4-(2-hydroxy-3-methylacryloxy)propoxybenzophenone and the like; benzotriazoles such as 2-(2′-hydroxy-5′-methylphenyl)benzotriazole, 2-(2-hydroxy-3,5-di(1,1-dimethylbenzylphenyl)2Hbenzotriazole, 2-(2′-hydroxy-3′,5′-ditertiary-butylphenyl)benzotriazole, 2-(2′-hydroxy-3′-tertiary-butyl-5′-methylphenyl)benzotriazole, 2-(3,5-ditertiary-amyl-2hydroxyphenyl)benzotriazole, 2-(2′-hydroxy-3′,5′-ditertiary-butylphenyl)-5-chlorobenzotriazole, 2-(2′-hydroxy-3′,5′-ditertiary-isoamylphenyl)benzotriazole, 2-(hydroxy-5-tertiary-butylphenyl)benzotriazole and the like; salicylic acid esters such as phenyl salicylate, 4-tertiary-butylphenyl salicylate, p-octylphenyl salicylate and the like; diphenyl acrylates such as ethyl-2-cyano-3,3′-diphenyl acrylate, 2-ethylhexyl-2-cyano-3,3′-diphenyl acrylate and the like; hydroxy-5-methoxyacetophenone; 2-hydroxynaphthophenone; 2-ethoxy-ethyl-p-methoxycinnamate; nickel bisoctylphenylsulfide; [2,2′-thiobis(4-t-octylphenolate)]-n-butylamine-nickel; oxalic acid anilide; etc. There are commercially available ultraviolet absorbers. As commercial products of benzotriazole type, there are mentioned, for example, Tinuvin 900 and Tinuvin 328, both of CIBA-Geigy Co. As products of benzophenone type, there is mentioned, for example, Uvinul 400 (a product of BASF). As products of oxalic acid anilide type, there is mentioned, for example, SANDUVOR 3206 of SANDOZ, Ltd.

The amount of ultraviolet absorber used is preferably 0.1 to 10 parts by weight, more preferably 0.5 to 5 parts by weight, based on 100 parts by weight of the modified polyolefin resin.

As the photostabilizer, there are mentioned, for example, tetrakis(2,2,6,6-tetramethyl-4-piperidyl) 1,2,3,4-butanetetracarboxylate, 8-acetyl-3-dodecyl7,7,9,9-tetramethyl-1,3,8-triazaspiro(4,5)decane-2,4-dione, bis(1,2,2,6,6-pentamethyl-4-piperidinyl) sebacate, bis(2,2,6,6-tetramethyl-4-piperidyl) sebacate, bis(1,2,2,6,6-pentamethyl-4-piperidyl) sebacate, dimethyl-2-(4-hydroxy-2,2,6,6-tetramethyl-1-piperidyl) ethanol condensate, poly[6-(1,1,3,3-tetramethylbutyl)imino-1,3,5-triazine-2,4-diyl-4-(2,2,6,6-tetramethylpiperidyl)hexamethylene-4,4-(2,2,6,6-tetramethylpiperidyl)imino], 1-[2-3-(3,5-di-t-butyl-4-hydroxyphenyl)propionyloxyethyl] -4-3-(3,5-di-t-butyl-4-hydroxyphenyl)propionyloxy)2,2,6,6-tetramethylpiperidine, etc. As the anti-oxidant, there are mentioned, for example, 4,4′-thiobis-(3-methyl6-t-butylphenyl), 2,2′-methylenebis-(4-methyl-6-t-butylphenol), 4,4′-methylenebis-(2,6-di-t-butylphenol), 1,3,5-trimethyl-2,4,6-tris(3,5-di-t-butyl-4-hydroxybenzyl) benzene, tris(2-methyl-4-hydroxy-5-t-butylphenyl)butene, pentaerythritol-tetrakis(3-laurylthiopropionate), dilaurylthio dipropionate, distearylthio dipropionate, dimyristylthio dipropionate, triethylene glycol bis-3-(3-t-butyl-5-methyl-4-hydroxyphenyl)propionate, 1,6-hexanediol bis-3-(3,5-di-t-butyl-4-hydroxyphenyl)propionate, 2,4-bis(n-octylthio)-6-(4-hydroxy-3,5-di-t-butylanilino)-1,3,5-triazine, pentaerythritol-tetrakis[3(3,5-di-t-butyl-4-hydroxyphenyl)-propionate], 2,2-thiodiethylene-bis[3-(3,5-di-t-butyl-4-hydroxyphenyl)-propionate], octadecyl 3-(3,5-di-t-butyl-4-hydroxyphenyl)propionate, 2,2-thiobis-(4-methyl-6-t-butylphenol), N,N′-hexamethylenebis-(3,5-di-t-butyl-4-hydroxy-hydroxycinnamamide), etc. The photostabilizer and/or the anti-oxidant is used preferably in combination with the ultraviolet absorber. The appropriate amount of photostabilizer used is 0.1 to 10 parts by weight, preferably 0.5 to 3 parts by weight based, on 100 parts by weight of modified polyolefin resin. The appropriate amount of anti-oxidant used is 0.1 to 5 parts by weight, preferably 0.2 to 3 parts by weight on the same basis.

According to the present invention, further, a corrosion-preventive pigment is blended into the barrier coat, which is effective for markedly improving the corrosion resistance of the coating film formed by the present invention.

The corrosion-preventive pigment which can be incorporated into the barrier coat refers to the pigment which has the function of inhibiting or preventing corrosion of metals, and is clearly distinguished from coloring pigments for simply imparting color and extender pigments for adjusting the physical properties of the coating film. As examples of such corrosion-preventive pigment, lead-type pigments, chromate-type pigments, metallic powder pigments. In the present process, the type of usable corrosion-preventive pigment is not particularly limited, but suitable ones are those having such a composition that, upon contact with water, of which corrosion-preventive component is eluted. Particularly preferred corrosion-preventive pigments are those of which extracts with water show electroconductivity of at least 100 μv/cm, particularly at least 300 μv/cm.

The electroconductivity of aqueous extract of a corrosion-preventive pigment is measured as follows: 80 parts by weight of deionized water having electroconductivity of not higher than 1 μv/cm and 20 parts by weight of the corrosion-preventive pigment are mixed and allowed to stand for 5 days at 30° C. (In the meantime, the mixture is mixed for 10 minutes per day). Then the supernatant liquid (aqueous extract) is separated and its electroconductivity is measured.

Examples of corrosion-preventive pigments having electroconductivity within the above-specified range include zinc chromate (1570 μv/cm), strontium chromate (973 μv/cm), barium chromate (736 μv/cm), calcium chromate (8000 μv/cm), basic lead chromate (111 μv/cm), basic lead sulfate (118 μv/cm), calcium phosphate (332 μv/cm), zinc molybdate (333 μv/cm), calcium molybdate (256 μv/cm), aluminum phosphomolybdate (182 μv/cm), barium metaborate (1540 μv/cm), ammonium metavanadate (7450 μv/cm) and the like. (The numerical values in the parentheses indicate the respective electroconductivity.) More than one of those can be used concurrently. Of those, particularly preferred are zinc chromate, strontium chromate, barium chromate and calcium chromate. The suitable amount of use of such corrosion-preventive pigment ranges 1–150 parts by weight, preferably 2–50 parts by weight, per 100 parts by weight of the modified polyolefin resin.

Such advance blending of corrosion-preventive pigment with the barrier coat can markedly improve the corrosion resistance of the coating system, as compared with the cases wherein the pigment is blended with the electrocoating paint.

The application of the barrier coat on the cation type electrocoating film already formed according to the method mentioned above can be conducted according to any known method such as spray coating, brush coating, dip coating, melt coating, electrostatic coating or the like. Normally preferred film thickness of the barrier coat ranges 1 to 20μ, particularly 2 to 10μ, in terms of thickness of dried film.

As mentioned previously, in the present process, on the surface of the barrier coat film formed is then coated an intermediate coating paint or a top coating paint. Prior to this coating, the barrier coat film can be baked. The prior baking is generally preferable but is not essential. Depending upon the type of paint to be applied on the barrier coat film, for example, when a top coating paint powder is directly applied on the barrier coat film, baking of the barrier coat film is not required and wet-on-wet application of an intermediate coating paint or a top coating paint is possible. There are cases where this wet-on-wet application is preferable.

The appropriate baking temperature is generally selected from the range of 60° to 160° C., particularly 80° to 130° C.

Intermediate coating paint

Onto the surface of the barrier coat film can be applied an intermediate coating paint, prior to the application of a top coating paint. The main purpose of conducting this intermediate coating is to give the final coating film high quality finish excellent in durability, surface smoothness and distinctness-of-image gloss, adhesion, etc. Therefore, when the final coating film is not required to have such a high quality, the intermediate coating can be omitted. However, in the preferred embodiments of the present invention, the application of an intermediate coating paint is generally preferable.

As the intermediate coating paint optionally usable in the present invention, there can be used any known intermediate coating paints which have been used in conventional coating systems consisting of a primer, an intermediate coating paint and a top coating paint and being excellent in adhesion, smoothness surface sharpness, overbaking resistance, weather resistance, etc. Specifically, there can be mentioned thermosetting intermediate coating paints using, as a chief vehicle component, a combination of (1) a short or ultra- short oil alkyd resin having an oil length of 30% or less and/or an oil-free polyester resin and (2) an amino resin. The alkyd resin and the polyester resin desirably have a hydroxyl value ordinarily of 60 to 140, particularly 80 to 120 and an acid value of 5 to 100.

As the particularly preferable alkyd resins and polyester resins, there can be mentioned resins obtained from esterification between a polyhydric alcohol (e.g. ethylene glycol, propylene glycol, butylene glycol, hexanediol, neopentyl glycol, glycerine, trimethylolethane, trimethylolpropane, pentaerythritol) and a polybasic acid (e.g. phthalic acid, maleic acid, terephthalic acid, adipic acid, tetrahydrophthalic acid, fumaric acid, itaconic acid, trimellitic acid, pyromellitic acid, their anhydrides).

As the oil usable for modification of the alkyd resin, there can be mentioned, for example, drying oils or semi-drying oils such as linseed oil, soybean oil, safflower oil, tung·oil, tall oil, dehydrated castor oil and the like, as well as unsaturated fatty acids obtained from said oils.

As the amino resin used in combination with the oil-modified alkyd resin or the oil-free polyester resin, generally there are suitably used melamine resins etherified with an alkyl group of 1 to 5 carbon atoms, urea resins, benzoguanamine resins, etc. With respect to the quantitative ratio of the amino resin to other resins, it is desirable that the oil-modified alkyd resin and/or the oil-free polyester resin is 65 to 85%, preferably 70 to 80% in terms of solid weight and the amino resin is 35 to 15%, preferably 30 to 20%. At least part of the amino resin can be replaced by a polyisocyanate compound or a blocked polyisocyanate compound. As the blocked or non-blocked polyisocyanate compound, there can be mentioned, for example, tolylene diisocyanate, diphenylmethane diisocyanate, xylylene diisocyanate, hexamethylene diisocyanate, isophorone diisocyanate, a reaction product between 1 mole of trimethylolpropane and 3 moles of tolylene diisocyanate or hexamethylene diisocyanate.

The intermediate coating paint using the above resins as vehicle components preferably has a form of organic solvent type or water-borne type (aqueous solution or aqueous dispersion). The organic solvent type is most preferable. The intermediate coating paint may also have a form of non-aqueous dispersion type, high solid type, powder type or the like. It is preferable that the intermediate coating film has a pencil hardness generally of 3B to 6H, preferably B to 2H at 20° C. The intermediate coating paint can further contain, if necessary, extender pigments, color pigments and other additives ordinarily used for coatings, in amounts ordinarily used.

The application of the intermediate coating paint on the barrier coat film can be conducted, as in the application of the barrier coat, by spray coating, brush coating, dip coating, melt coating, electrostatic coating or the like. It is preferable that the intermediate coating film has a thickness generally of 10 to 100μ, preferably 15 to 50μ, when cured. The curing of the intermediate coating film can be conducted at any temperature suitable for the curing characteristics of the film as long as the temperature causes no substantial thermal deterioration of the film. However, when curing is effected by heating, the curing temperature is preferably 60° to 170° C., more preferably 80° to 150° C.

Top coating paint

This is a paint to be applied on the surface of the barrier coat film or of the intermediate coating film in order to give the coated bodies pleasant appearance. As this top coating paint, there can be used top coating paints used in conventional coating systems consisting of a primer, an intermediate coating and a top coating. As such a top coating paint, there can generally be used conventionally known paints capable of forming a coating film excellent in surface appearance (e.g. distinctness-of-image gloss, smoothness, gloss), weather resistance (e.g. gloss retention, color retention, chalking resistance), chemical resistance, moisture resistance, curability, etc. As the top coating paint usable in the present invention, there can be mentioned, for example, paints preferably of organic solvent type or water-borne type, using as the main vehicle component a resin such as an amino-acrylic resin type, an acid/a glycidyl-acrylic resin type, an isocyanate-acrylic resin type, an aminoalkyd resin system, an amino-polyester resin type, an isocyanate-polyester resin type or the like.

Preferable examples of the top coating paints include those of amino-acrylic resin type, namely, thermosetting paints using amino resins as the crosslinking agent. Such paints use, as main components, (a) an acrylic resin obtained by polymerizing an appropriate combination of a hard monomer (e.g. methyl methacrylate, ethyl methacrylate, n-butyl methacrylate, isobutyl methacrylate), a soft monomer (e.g. n-hexyl methacrylate, lauryl methacrylate, methyl acrylate, ethyl acrylate, n-butyl acrylate, 2-ethylhexyl acrylate), a functional group-containing monomer (e.g. acrylic acid, methacrylic acid, hydroxyethyl methacrylate, hydroxyethyl acrylate, acrylamide, glycidyl acrylate) and other monomer (e.g. styrene, acrylonitrile) and (b) an amino resin selected from resins such as a melamine resin etherified with an alkyl group of 1 to 5 carbon atoms and an urea resin etherified with an alkyl group 1 to 5 carbon atoms. Said acrylic resin (a) preferably has a number average molecular weight of 5,000 to 50,000, a hydroxyl value of 5 to 40 and an acid value of 2 to 100. Another preferable example of the top coating paint is an amino-alkyd resin type paint, wherein a butylated melamine resin is preferable as the amino resin component and an alkyd resin modified with a semi-drying oil or an ultra-short oil alkyd resin is preferable as the alkyd resin component.

When the top coating paint is particularly a paint capable of forming an ultra-hard film, the composite coating film formed in accordance with the present invention has a remarkably improved scuff resistance and is hard and flexible. This composite coating film, since its uppermost layer is an ultra-hard film and accordingly is hard, can almost completely prevent the formation of scuffs caused by a car washing brush, a polishing compound, dust, etc. and possesses improved weather resistance. Further the composite coating film, since it also contains a barrier coat film having physical properties as mentioned previously beneath or below the uppermost layer, even if it receives a strong impact force by collision of rock salt, pebbles, etc. at the outermost ultra-hard film, can absorb completely or almost completely the impact energy within the barrier coat film; thereby, the impact energy does not reach the electrocoating film beneath the barrier coating film and yet the top coating film (and the intermediate coating film) receive little physical damage. That is, the barrier coat film functions as a buffer zone for impacts applied from outside, whereby the composite coating film has remarkably improved chipping resistance, the metallic substrate such as a steel panel can be protected from development of rust and corrosion caused by chipping, and the top coating film can be free from damage by collision of rock salt, pebbles, etc. Thus, the composite coating film is hard and flexible and accordingly exhibits its excellent performances as mentioned above.

"Ultra-hard film" said herein is a coating film having a hardness (as cured) of 4H to 9H at 20° C. when measured in accordance with a pencil hardness testing method.

The pencil hardness testing method used in the present invention is such that a glass plate is coated with a paint to be tested according to the present invention, the resulting composite coating film is cured, the resulting test plate is kept at 20° C., a pencil ("Uni" for drawing use, manufactured by Mitsubishi Pencil Ltd.) whose lead tip has been ground flatly so as to have a sharp edge is strongly pressed onto the coated surface of the test plate at an angle of 45° at such a pressure as the pencil lead is not broken, in this condition the pencil is moved by about 1 cm at a speed of 3 sec/cm, and in this way there is measured the hardness of the hardest pencil causing no scratch.

At the top coating paint capable of forming such an ultra-hard film, there can be mentioned, for example, crosslinking -curable paints using, as a vehicle component, a resin such as an amino-acrylic resin type, an amino-alkyd resin type, an amino-polyester resin type, an amino-fluorine resin type, an amino-silicone-polyester resin type, an unsaturated polyester resin type, an isocyanate-acrylic resin type, an isocyanate-polyester resin type, an isocyanate-fluorine resin type, an unsaturated acrylic resin type or the like. The preferable of these are top coating paints of amino-alkyd resin type, amino-acrylic resin type, amino-silicone-polyester resin type.

As the method for forming an ultra-hard film, there can be mentioned, for example, (1) when the vehicle component is polyester resin- or an alkyd resin-based, a method wherein the polybasic acid component of said resin is a hard, aromatic type polybasic acid such as phthalic acid, isophthalic acid, terephthalic acid, trimellitic acid, their anhydrides or the like, (2) when the vehicle component is acrylic resin-based, a method wherein as said resin a hard, acrylic type resin using the monomer component which gives a high glass transition temperature and (3) a method wherein the vehicle component is a resin having a relatively large molecular weight and containing within the molecule a large proportion of crosslinkable functional groups and the amount and type of catalyst (internal or external catalyst) and/or the amount and type of crosslinking agent (or curing agent) are suitably selected.

The form of the top coating paint used in the present invention has no particular restriction and can be of organic solvent type, non-aqueous dispersion type, aqueous solution type, aqueous dispersion type, powder type, high solid type, etc.

The top coating paint used in the present invention is classified into (1) an enamel paint obtained by adding, to a paint using the above mentioned main vehicle component, metallic pigments and/or coloring pigments and (2) a clear paint completely or substantially free from these pigments. Using such a paint, a top coating film can be formed thermally accordin to, for example, the following methods. (1) A metallic paint containing metallic pigments and, if necessary, coloring pigments or a solid color paint containing coloring pigments is applied and heat-cured. (Metallic or solid color finishing by 1-coat 1-bake system) (2) A metallic paint or a solid color paint is applied and heat-cured. Then, a clear paint is applied and again heat-cured. (Metallic or solid color finishing by 2-coat.2-bake system) (3) A metalic paint or a solid color paint and then a clear paint are applied. Subsequently, the resulting two films are cured simultaneously. (Metallic or solid color finishing by 2-coat.1-bake system)

The top coating paints mentioned above are applied preferably by spray coating, electrostatic coating, etc. The resulting coating film is dried and/or cured by room temperature drying, heat drying, heat curing, crosslinking curing by irradiation of active energy rays (e.g. electron rays, ultraviolet rays), etc., depending upon the form, type, etc. of paint applied.

The top coating film formed as above preferably has a thickness (as dried) of 25 to 40μ when the method (1) is used and 10 to 30μ (metallic and solid color paints) and 25 to 50μ (clear paint) when the method (2) or (3) is used. The heating condition of the top coating film can vary depending upon the type of vehecle component used. However, preferably it is generally 60° to 170° C., particularly 80° to 150° C. and 10 to 40 min.

When a top coating paint of powder type is mainly used as the top coating paint, there can be used, for example, the following coating and baking methods. (a) An enamel solid color paint of powder form obtained by adding color pigments to the vehicle component of the above mentioned powder paint is applied on the barrier coat film and baked. (Solid color finishing by 1-coat.1-bake system) (b) A solid color or metallic paint of liquid form is applied on the barrier coat film. Then, after or without baking, the above mentioned clear paint of powder form substantially or completely free from color pigments is applied and baking is conducted. (A solid color or metallic finishing by 2-coat.1-bake or by 2-coat.2-bake system)

In the method (a), after the barrier coat film has been baked, preferably a barrier coat containing a compatible solvent is applied. Thereon, without baking, is applied a solid color enamel paint of powder form so that this application can give a film having a thickness (after baking) of about 30 to 150μ. The resulting film is baked at 80° to 210° C., particularly 120° to 180° C. By allowing the barrier coat film to contain a compatible solvent, the development of fine unevennesses (as seen on orange skins) on the surface of the top coating film can be prevented and the top coating film can be finished to have the surface of excellent smoothness.

In the method (b), a barrier coat is applied and, after or without baking, a solid color or metallic paint of liquid form is applied thereon so that the latter application can give a film having a thickness (after baking) of 10 to 30μ. Then, after baking at, for example, 60° to 170° C. or without baking, the above mentioned clear paint of powder form is applied so as to give a film having a thickness (after baking) of 30 to 150μ and baking is conducted at 60° to 170° C., particularly 80° to 160° C.

The top coating film formed can have a pencil hardness generally of 2B to 9H at 20° C., depending upon factors such as the type of vehicle component contained in the film.

The coating system formed by the above-described process of the present invention is excellent in the finished appearance (e.g., smoothness, gloss, surface sharpness, etc.), waterproof property and weatherability, etc., and is markedly improved particularly in chipping resistance, corrosion resistance and other physical (mechanical) properties. The coating system is particularly suitable for automotive bodies.

The present invention will be more specifically described hereinbelow, with reference to Examples and Comparative Examples, in which parts and percentages are by weight, unless specified otherwise.

I SAMPLES

(1) Metallic substrate (A) A steel panel treated with a surface treating agent of zinc phosphate type (dimensions: 300 mm×90 mm×0.8 mm). (B) A steel panel having an acute-angled portion obtained by bending the steel panel (A) by 90°.

(2) Cation type electrocoating paints (A) A paint using, as vehicle components, a polyamide-modified bisphenol type epoxy resin (acetic acid used as a neutralizing agent) and a block polyisocyanate compound (pH:6.5, solid content:20% water absorption of coating film:2.1%). (B) A paint comprising 100 parts of the vehicle components of paint (A) above and 61.5 parts of pigments composed of titanium dioxide, carbon black and clay at a weight ratio of 30:1.5:30 (pH:6.5, solid content:20%, water absorption of coating film:3.6%). This coating film by itself showed insufficient surface smoothness. (C) A paint comprising 100 parts of the vehicle components of paint (A) and 79 parts of the pigments of paint (B) (pH:6.5, solid content:20%, water absorption of the coating film:4.5%). This coating film by itself had an inferior surface smoothness.

(3) Barrier coat (A) A dispersion formed by dispersing 100 parts of a resin formed by graft polymerizing maleic acid onto a propylene-ethylene copolymer and 15 parts by weight of zinc chromate in toluene (static glass transition temperature: −43° C., elongation at break at −20° C.:410%). (B) A dispersion formed by dispersing 100 parts of a mixture of the graft copolymer of (A) above and rosin (blend ratio=10:1 by weight) and 25 parts of strontium chromate in toluene (static glass transition temperature: −52° C., elongation at break at −20° C.: 700%). (C) A dispersion formed by dispersing 100 parts of the graft copolymer of (A), 35 parts of barium chromate, 1 part of 2-(2-hydroxy-3,5-di(1,1-dimethylbenzene)phenyl-2H benzotriazole as an ultraviolet ray absorber and 0.5 part of bis(1,2,2,6,6-pentamethyl-4-piperidinyl)sebacate as a photostabilizer, in toluene. (D) A dispersion formed by dispersing 100 parts of the resin solid component used in (B) above, 40 parts of calcium chromate, 1.5 parts of 2-hydroxy-4-methoxybenzophenone as an ultraviolet ray absorber, and 0.8 part of pentaerythrityl-tetrakis-[3-(3,5-di-t-butyl-4-hydroxyphenyl)-propionate] as an antioxidant, in toluene. (E) A dispersion formed by dispersing 100 parts of a modified polyolefin resin composed of a mixture of the graft copolymer of (A) above with rosin (blend ratio=10:1 by weight) and 30 parts of strontium chromate in 200 parts of mixed organic solvent composed of cellosolve acetate and toluene (blend ratio=30:70 by weight) (static glass transition temperature: −52° C., elongation at break at −20° C.: 700%). (F) A dispersion formed by dispersing 100 parts of the graft copolymer of (A), 25 parts of zinc chromate, 1 part of 2-2-hydroxy-3,5-di(1,1-dimethylbenzyl)phenyl]-2H-benzotriazole as an ultraviolet ray absorber and 0.5 part of bis(1,2,2,6,6-pentamethyl-4-piperidinyl)-sebacate as a photostabilizer, in 200 parts of mixed solvent of methyl acetate/toluene (10/90 by weight). (G) A dispersion identical with (E) above, except that the mixed solvent is changed to that composed of dimethyl phthalate/toluene (5/95 by weight). (H) A dispersion formed by dispersing 100 parts of the graft copolymer of (A) and 20 parts of barium chromate in 200 parts of mixed solvent composed of isophorone/toluene (20/80 by weight). (I) A dispersion formed by dispersing in toluene a resin formed by graft-polymerizing maleic acid to a propylene-ethylene copolymer (static glass transition temperature: +5° C.)

(4) Intermediate coating paint

Amilac N-2 Sealer (an intermediate coating paint of amino polyester resin type manufactured by KANSAI PAINT CO., LTD.).

(5) Top coating paints (A) Amilac White (a top coating paint of aminoalkyd resin type, manufactured by KANSAI PAINT CO., LTD., a 1-coat 1-bake white paint, pencil hardness at 20° C.: H). (B) Magicron Silver (a top coating paint of aminoacrylic resin type, manufactured by KANSAI PAINT CO., LTD., a 2-coat 1-bake silver metallic paint, pencil hardness at 20° C.: H). (C) Magicron Clear (a top coating paint of aminoacrylic resin type, manufactured by KANSAI PAINT CO., LTD., a 2-coat.1-bake clear paint, pencil hardness at 20° C.: H). (D) Magicron Black (a top coating paint of aminoacrylic resin type, manufactured by KANSAI PAINT Co., Ltd., pencil hardness at 20° C.: 5H). (E) Magicron Clear H (a top coating paint of aminoacrylic resin type, manufactured by KANSAI PAINT Co., Ltd., a 2-coat 1-bake clear paint, pencil hardness at 20° C.: 5H). (F) Radicure P Black (an electron rays-curing type paint using an acrylate-polyester resin, manufactured by KANSAI PAINT CO., LTD., pencil hardness at 20° C.: 6H). The coating film of this paint was cured by applying 6 Mrad of electron rays at 270 KeV. (G) A glycidyl group-containing acrylic resin/dodecanedioic acid type white powdery paint (pencil hardness at 20° C.: H). (G) A glycidyl group-containing acrylic resin/-dodecanedioic acid type powdery clear paint (pencil hardness at 20° C.: H).

II. EXAMPLES AND COMPARATIVE EXAMPLES

Using the above samples, the metallic substrates were applied with the cation type electrocoating, barrier coat, intermediate coating and top coating, with the steps as specified in Table 1 below.

In Table 1, the conditions of cation type electrocoating were as follows: bath temperature: 28° C., pH: 6.5, load voltage: about 250 V, electrification: about 180 sec. After the electrocoating, water washing was conducted and then baking was conducted at 170° C. for 30 min. All film thicknesses are those after curing.

The barrier coats were applied using an air spray machine. All film thicknesses were 6 to 10μ after drying at flat portions. In the systems wherein the powdery paints were directly applied without the intermediate coating, the barrier coat was not baked (left to stand at room temperature for 10 minutes). In all other cases the barrier coat was baked for 30 minutes at 120° C.

The intermediate coating paints and the top coating paints were spray-coated using an electrostatic coating equipment.

In the top coating, "1C1B" refers to a coating system wherein a color paint is applied and then baked at 160° C. for 30 min. "2C1B" refers to a coating system wherein a metallic paint and a clear paint are applied in this order on a wet-on-wet basis and then the resulting two films are simultaneously baked at 160° C. for 30 min. and cured. All film thicknesses are those at flat portions.

TABLE 1

| | | Example | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Metallic substrate | | | | (A) | | | | | (B) | | | | | (A) | | | | | (A) | | | | (B) |
| Cation electro-coating | paint | | | (A) | | | | (B) | | | (C) | | | (A) | | | | | (A) | | | | (B) |
| | film thickness (μ) | | | | | | | | | | | | | | | | | | | | | | |
| | flat portion | | | 20 | | | | 20 | | | 20 | | | 20 | | | | | 20 | | | | 20 |
| | acute-angled portion | | | — | | | | 4 | | | 7 | | | — | | | | | — | | | | 4 |
| Barrier coating | paint | | (A) | | | (B) | | (A) | | (B) | (A) | (B) | (A) | | (B) | | (A) | | (C) | | (D) | | (C) |
| Intermediate coating | | baking conditions 140° C. 30 min., film thickness 20μ | | | | | | | | | | | | | | | | | — | | | | |
| Top coating | coating system | 1C1B | 2C1B | 1C1B | | 2C1B | 1C1B | 2C1B | 1C1B | | 2C1B | | 1C1B | 1C1B | 2C1B | 1C1B | 1C1B | 2C1B | 1C1B | | 2C1B | | |
| | paint | (A) | (B) | (G) | (A) | (B) | (A) | (B) | (G) | | (B) | | (D) | (F) | (D) | (F) | (A) | (B) | (A) | (B) | (D) | | (B) |
| | film thickness (μ) | 35 | 15 | 50 | 35 | 15 | 35 | 15 | 50 | | 15 | | 15 | 35 | 15 | 35 | 35 | 15 | 35 | 15 | 15 | | 15 |
| | paint | | (C) | | | (C) | | (C) | | | (C) | | (E) | | (E) | | | (C) | | (C) | (E) | | (C) |
| | film thickness (μ) | | 35 | | | 35 | | 35 | | | 35 | | 35 | | 35 | | | 35 | | 35 | 35 | | 35 |
| | film-curing condition | 140° C. · 30 min. | | 160° C. · 30 min. | | 140° C. · 30 min. | | | 160° C. · 30 min. | | 140° C. · 30 min. | | | | 140° C. · 30 min. | | | | 140° C. · 30 min. | | | | |

| | | Example | | | | | | | | | | | Comparative Example | | | | | | | | |
|---|---|---|---|---|---|---|---|---|---|---|---|---|---|---|---|---|---|---|---|---|---|
| | | 23 | 24 | 25 | 26 | 27 | 28 | 29 | 30 | 31 | 32 | 33 | 1 | 2 | 3 | 4 | 5 | 6 | 7 | 8 | 9 |
| Metallic substrate | | | (A) | | | | | (B) | | | (B) | | | (A) | | | | | (B) | | |
| Cation electro-coating | paint | | (A) | | | | | (B) | | (B) | (C) | | | (A) | | | | | (B) | | |
| | film thickness (μ) | | | | | | | | | | | | | | | | | | | | |
| | flat portion | | 20 | | | | | 20 | | 20 | 20 | | | 20 | | | | | 20 | | |
| | acute-angled portion | | — | | | | | 4 | | 4 | 7 | | | — | | | | | 4 | | |
| Barrier coating | paint | (E) | (F) | (G) | (H) | (A) | (A) | | (B) | (B) | (A) | (B) | | — | | (I) | | — | | (I) | |
| Intermediate coating | | | — | | | | | baking conditions 140° C. · 30 min. film thickness 20μ | | | | | baking conditions 140° C. · 30 min., film thickness 20μ | | | | | | | | |
| Top coating | coating system | 1C1B | 2C1B | | 1C1B | | 2C1B | 1C1B | 2C1B | 1C1B | 2C1B | 1C1B | 1C1B | 2C1B | 1C1B | 2C1B | 1C1B | 2C1B | | 1C1B | |
| | paint | (G) | (B) | | (G) | | (D) | (F) | (D) | (F) | (D) | (F) | (A) | (B) | (A) | (B) | (A) | (B) | (G) | (A) | (G) |
| | film thickness (μ) | 35 | 15 | | 50 | | 15 | 35 | 15 | 35 | 15 | 35 | 35 | 15 | 35 | 15 | 35 | 15 | 50 | 35 | 50 |
| | paint | | (H) | | | | (E) | | (E) | | (G) | | | (C) | | (C) | | (C) | | | |
| | film thickness (μ) | | 35 | | | | 35 | | 35 | | 35 | | | 35 | | 35 | | 35 | | | |
| | film-curing condition | | 160° C. · 30 min. | | | | 140° C. · 30 min. | | 140° C. · 30 min. | | 140° C. · 30 min. | | | | 140° C. · 30 min. | | | | 160° C. · 30 min. | 140° C. · 30 min. | 160° C. · 30 min. |

TABLE 1-continued

| | | Comparative Example | | | | | | | | | | | | | | | | | |
|---|---|---|---|---|---|---|---|---|---|---|---|---|---|---|---|---|---|---|---|
| | | 10 | 11 | 12 | 13 | 14 | 15 | 16 | 17 | 18 | 19 | 20 | 21 | 22 | 23 | 24 | 25 | 26 | 27 |
| Metallic substrate | | (B) | | | | (A) | | | | (B) | | (A) | | | | (B) | | | |
| Cation electro-coating | paint | (C) | | | | (A) | | | | (B) | | (A) | | | (B) | | | (C) | |
| | film thickness (μ) flat portion | 20 | | | | 20 | | | | 20 | | 20 | | | 20 | | | 20 | |
| | acute-angled portion | 7 | | | | — | | | | 4 | | — | | | 4 | | | 7 | |
| Barrier coating | paint | — | (I) | — | | (I) | — | | (I) | | — | | (I) | — | | (I) | | | (I) |
| Intermediate coating | | baking conditions 140° C. 19 30 min. film thickness 20μ | | baking conditions 140° C. 19 30 min. film thickness 20μ | | | | | | — | | | | | | baking conditions 140° C. 19 30 min. film thickness 20μ | | | |
| Top coating | coating system | 2C1B | | 2C1B | 1C1B | 2C1B | 1C1B | | 2C1B | | 1C1B | 2C1B | 1C1B | 2C1B | 1C1B | 2C1B | | 1C1B | 2C1B |
| | paint | (B) | | (D) | (F) | (D) | (A) | | (B) | | (G) | (B) | (G) | (D) | (F) | (D) | | (F) | (D) |
| | film thickness (μ) | 15 | | 15 | 35 | 15 | 35 | | 15 | | 50 | 15 | 50 | 15 | 35 | 15 | | 35 | 15 |
| | paint | (C) | | (E) | | (E) | | | (C) | | | (H) | | (E) | | (E) | | | (E) |
| | film thickness (μ) | 35 | | 35 | | 35 | | | 35 | | | 35 | | 35 | | 35 | | | 35 |
| | film-curing condition | 140° C. · 30 min. | | 140° C. · 30 min. | | | 140° C. · 30 min. | | | | | 160° C. · 30 min. | | 140° C. · 30 min. | | 140° C. · 30 min. | | | 140° C. · 30 min. |

III RESULTS OF PERFORMANCE TESTS

The coated panels obtained in the above Examples and Comparative Examples were subjected to performance tests. The results are shown in Table 2 which appears later.

(Test items and test methods)

1. Chipping resistanc (1) Gravel testing machine: Q-G-R Gravelometer manufactured by Q Panel Co. (2) Stones to be blown: Crushed stones having diameters of about 15 to 20 mm. (3) Volume of stones to be blown: About 500 ml. (4) Blowing air pressure: About 4 kg/cm$^2$. (5) Test temperature: About 20° C.

A test panel was fixed to a support panel. About 500 ml of crushed stones were allowed to hit the test panel using a blowing air pressure of about 4 kg/cm$^2$. Thereafter the test panel was tested for film surface condition and salt spray resistance. Film surface condition was examined visually and evaluated based on the criteria given below. In the test of salt spray resistance, a test panel after having been hit by the crushed stones was subjected to a salt water spray test by JIS Z 2371 for 960 hrs; then, an adhesive cellophane tape was stuck on the film surface of the test panel and rapidly peeled off; and the state of subsequent rust development, condition of corrosion, peeling of coating film, etc. at the hit portions were observed.

Evaluation criteria (1) Film surface condition

◎: Cracking by hitting was recognizable very slightly at the limited places of the top coating film. There was no peeling of the electrocoating film.

O: Cracking by hitting was recognizable in places of the top coating film and peeling of the electrocoating film was seen at less numbers of places.

Δ: Top coating peeled off at many places and peeling of electrocoated film occurred at a minor degree.

X: The greatest part of the top coating film peeled off. An electrocoating film peeled off at the hit portions and their surrounding areas.

(2) Salt spray resistance

◎: Rust development, corrosion, film peeling, etc. were not observed.

O: Rust, corrosion and film peeling were slight.

Δ: Rust, corrosion and film peeling were a little severe.

X: Rust, corrosion and film peeling were very severe.

Chipping resistance after acceleration exposure was tested in accordance with the above method after the coated panel had been exposed for 2,000 hrs in a sunshine weatherometer (WEL-SUN-HC Model manufactured by Suga Shikenki K.K.).

2. Impact resistance

This test was conducted in an atmosphere of 0° C. in accordance with JIS K 5400-1979 6.13 3B. A weight of 500 g was dropped from a height of 50 cm to examine the damage incurred on the coating film.

◎: No change.

Δ: Slight appearance of cracks and peeling.

X: Severe cracks and peeling.

3. Adhesion

One-hundred (100) squares of each 1 mm×1 mm in size were cut on the coating film in accordance with JIS K 5400-1979 6.15. An adhesive cellophane tape was stuck thereon, and rapidly peeled off. The number of remaining squares was counted.

Adhesion after acceleration exposure was tested in accordance with the above method after a test panel had been exposed for 2,000 hrs in a sunshine weatherometer (WEL-SUN-HC manufactured by Suga Shikenki K.K.).

4. Water resistance

The test panel was immersed in water of 40° C. for 10 days and the film surface was evaluated.

◎: No change.

5. Smoothness

A test panel was visually examined for the occurrence of unevenness on the film surface.

◎: Almost none.

Δ: Slight

X: Heavy

6. Corrosion resistance at acute-angled portion

A test panel was subjected to the same salt water spray test as in "1. Chipping resistance" for 960 hrs. The condition of film surface at the acute-angled portion was examined visually.

◎: No rust development.

Δ: Slight rusting.

X: Severe rusting.

7. Filiform corrosion resistance

In the coating film of a test panel two lines were cut diagonally with a cutter down to the substrate of the panel. Then the test panel was placed in a salt spray tester of JIS Z 2371 for 48 hrs, after which the film surface was washed with deionized water. Then, the test panel was placed in a constant temperature and constant humidity box (temperature: 40° ±2° C., R.H.: 85±2%) for 960 hrs and the extent of filiform corrosion on the test panel was examined. An average length and density of filiform corrosion were recorded.

Evaluation criteria

F: 2 to 3 or less filiform corrosions within each 10 mm portion of cut lines

M: around 5 to 6 filiform corrosions within each 10 mm portion of cut lines

D: 10 or more filiform corrosions within each 10 mm portion of cut lines

8. Scab corrosion resistance

A test panel was immersed in warm water of 40° C. for 120 hrs and then dried for 4 hrs at 20° C. The resulting test panel was subjected to the chipping with 300 g of No. 6 crushed stones at a pressure of 4 kg/cm$^2$ and also to straight line cutting. Then, the panel was subjected to repetition of a unit test immersion in 5% aqueous NaCl solution at 30° C. for 2 hrs→standing at −20° C. for 1 hr→standing outdoors for 45 hrs). This unit test was conducted 3 times per week as one cycle. After 15 cycles, the surface conditions of the film (particularly, rust, swelling, etc.) were examined.

◎: No distinct change.

Δ: Slight rust and swelling.

X: Severe rust and swelling.

9. Pencil hardness

The hardness of the hardest pencil which gave no scratch on the top coat at 20° C.

10. Scuff resistance

On a test panel held horizontally were laid 4 sheets of victoria lawn at 20° C. Thereon was placed a weight of 1 kg (for use in even balances and having a flat bottom of 5 cm in diameter). By holding the ends of the victoria lawn sheets and pulling them, the lawn sheets and the weight were moved on the panel reciprocately 20 times at a speed of 20 cm/sec. Then, the film surface condition was evaluated.

⊚: Substantially free from scuff.
Δ: Slight scuff.
X: Severe scuff.

TABLE 2

| | Example 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Chipping Resistance | | | | | | | | | | | | | | | | | | | | | | | | |
| before exposure | | | | | | | | | | | | | | | | | | | | | | | | |
| surface condition | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| salt spray resistance | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| after exposure | | | | | | | | | | | | | | | | | | | | | | | | |
| surface condition | — | — | — | — | — | — | — | — | — | — | — | — | — | — | — | ◎ | Δ | ◎ | ◎ | ◎ | ◎ | ◎ | ◎ | ◎ |
| salt spray resistance | — | — | — | — | — | — | — | — | — | — | — | — | — | — | — | ◎ | ◎ | ◎ | ◎ | ◎ | ◎ | ◎ | ◎ | ◎ |
| Impact resistance | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Adhesion | | | | | | | | | | | | | | | | | | | | | | | | |
| before exposure | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| after exposure | — | — | — | — | — | — | — | — | — | — | — | — | — | — | — | 100 | 90 | 100 | 100 | 100 | 100 | 100 | 100 | 100 |
| Water resistance | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Smoothness | ◎ | ◎ | Δ | ◎ | ◎ | ◎ | ◎ | Δ | ◎ | ◎ | ◎ | ◎ | ◎ | ◎ | ◎ | ◎ | ◎ | ◎ | ◎ | ◎ | ◎ | ◎ | ◎ | Δ |
| Corrosion resistance at acute-angled portion | — | — | — | — | — | ◎ | ◎ | ◎ | ◎ | ◎ | ◎ | — | — | — | — | — | — | — | — | — | — | ◎ | — | — |
| Linear rust resistance | F | F | F | F | F | F | F | F | F | F | F | F | F | F | F | F | F | F | F | F | F | F | F | F |
| Scab corrosion resistance | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Pencil hardness | H | H | H | H | H | H | H | H | H | H | 5H | 6H | 5H | 6H | H | H | H | H | 6H | H | H | H | H | ◎ |
| Scuff resistance | — | — | — | — | — | — | — | — | — | — | — | ◎ | ◎ | ◎ | ◎ | — | — | — | — | ◎ | — | — | — | — |

| | Example 25 | 26 | 27 | 28 | 29 | 30 | 31 | 32 | 33 | Comparative Example 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|---|---|---|---|---|---|
| Chipping Resistance | | | | | | | | | | | | | | | | | | | | | | | | |
| before exposure | | | | | | | | | | | | | | | | | | | | | | | | |
| surface condition | ◎ | ◎ | ◎ | ◎ | ◎ | ◎ | ◎ | ◎ | ◎ | X | X | X | Δ | X | X | X | Δ | Δ | X | Δ | X | X | Δ | X |
| salt spray resistance | ◎ | ◎ | ◎ | ◎ | ◎ | ◎ | ◎ | ◎ | ◎ | X | X | X | Δ | X | X | X | Δ | Δ | X | Δ | X | X | Δ | X |
| after exposure | | | | | | | | | | | | | | | | | | | | | | | | |
| surface condition | ◎ | ◎ | ◎ | — | — | — | — | — | — | — | — | — | — | — | — | — | — | — | — | — | — | — | — | X |
| salt spray resistance | ◎ | ◎ | ◎ | — | — | — | — | — | — | — | — | — | — | — | — | — | — | — | — | — | — | — | — | X |
| Impact resistance | ◎ | ◎ | ◎ | ◎ | ◎ | ◎ | ◎ | ◎ | ◎ | X | X | X | Δ | X | X | X | Δ | Δ | X | Δ | X | X | X | X |
| Adhesion | | | | | | | | | | | | | | | | | | | | | | | | |
| before exposure | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| after exposure | 100 | 100 | 100 | — | — | — | — | — | — | — | — | — | — | — | — | — | — | — | — | — | — | — | — | 50 |
| Water resistance | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Smoothness | ◎ | ◎ | Δ | ◎ | ◎ | ◎ | ◎ | ◎ | ◎ | ◎ | ◎ | ◎ | ◎ | X | X | X | Δ | Δ | X | X | ◎ | ◎ | ◎ | ◎ |
| Corrosion resistance at acute-angled portion | — | — | — | ◎ | ◎ | ◎ | ◎ | ◎ | ◎ | — | — | — | — | X | X | X | Δ | Δ | X | X | — | — | — | — |
| Linear rust resistance | F | F | F | F | F | F | F | F | F | D | D | D | D | D | D | D | D | D | D | D | D | D | D | D |
| Scab corrosion resistance | ◎ | ◎ | ◎ | ◎ | ◎ | ◎ | ◎ | ◎ | ◎ | X | X | X | X | X | X | X | X | X | X | X | X | X | X | X |
| Pencil hardness | H | H | H | 5H | 6H | 5H | 6H | 5H | 6H | H | H | H | H | H | H | H | H | H | H | H | 5H | 6H | 5H | H |

TABLE 2-continued

Scuff resistance — — — — — — — — — — — — — — —

| | Comparative Example | | | | | | | | | | | |
|---|---|---|---|---|---|---|---|---|---|---|---|---|
| | 16 | 17 | 18 | 19 | 20 | 21 | 22 | 23 | 24 | 25 | 26 | 27 |
| Chipping Resistance | | | | | | | | | | | | |
| before exposure | | | | | | | | | | | | |
| surface condition | X | X | X | X | X | X | X | X | Δ | X | X | Δ |
| salt spray resistance | X | X | X | X | X | X | X | X | Δ | X | X | Δ |
| after exposure | | | | | | | | | | | | |
| surface condition | X | X | X | X | X | X | — | — | — | — | — | — |
| salt spray resistance | X | X | X | X | X | X | — | — | — | — | — | — |
| Impact resistance | X | Δ | X | X | X | Δ | X | X | X | X | X | Δ |
| Adhesion | | | | | | | | | | | | |
| before exposure | 100 | 100 | 100 | 100 | 100 | 100 | 100 | 10C | 100 | 100 | 100 | 100 |
| after exposure | 50 | 50 | 50 | 50 | 50 | 50 | — | — | — | — | — | — |
| Water resistance | ◎ | ◎ | ◎ | ◎ | ◎ | ◎ | ◎ | ◎ | ◎ | ◎ | ◎ | ◎ |
| Smoothness | ◎ | ◎ | X | Δ | Δ | Δ | X | X | Δ | X | X | Δ |
| Corrosion resistance at acute-angled portion | — | — | X | — | — | — | X | X | Δ | X | X | Δ |
| Linear rust resistance | D | D | D | D | D | D | D | D | D | D | D | D |
| Scab corrosion resistance | X | X | X | X | X | X | X | X | X | X | X | X |
| Pencil hardness | H | H | H | H | H | H | 5H | 6H | 5H | 6H | 5H | 6H |
| Scuff resistance | — | — | — | — | — | — | ◎ | ◎ | ◎ | ◎ | ◎ | ◎ |

What we claim is:

1. A process for coating a metallic substrate, characterized by applying on a metallic substrate a cationic electrodeposition paint, applying thereon a barrier coat comprising a modified polyolefin resin and capable of forming a barrier coat film having a static glass transition temperature of 0° to −60° C. and a corrosion-preventive pigment, and then applying thereon a top coating paint said modified polyolefin resin being selected from the group consisting of (i) resins obtained by graft-polymerizing maleic acid or maleic anhydride onto base polyolefin resins, (ii) resins obtained by graft-polymerizing acrylic acid or methacrylic acid onto chlorinated products of base polyolefin resins, (iii) copolymers between (a) at least one member selected from ethylenic hydrocarbons and (b) at least one comonomer selected from vinyl acetate, acrylic acid and methacrylic acid, (iv) compositions obtained by adding 1 to 90 parts by weight of chlorinated polyolefins to 100 parts by weight of base polyolefins, (v) compositions obtained by adding 1 to 90 parts by weight of acrylic resins having a static glass transition temperature of 0° C. or lower and a number average molecular weight of 5,000 to 100,000 to 100 parts by weight of base polyolefin resins, and (vi) compositions obtained by adding 1 to 90 parts by weight of a styrene-butadiene copolymer to 100 parts by weight of base polyolefin resins.

2. The process according to claim 1, wherein the cationic electrode position paint is a thermosetting cathodic deposition paint obtained by neutralizing a base resin having basic amino groups with an acid and dissolving or dispersing the resulting resin in water.

3. The process according to claim 1, wherein the cation electrodeposition paint contains 35 parts by weight or less of pigments based on 100 parts by weight of resin solid.

4. The process according to claim 1, wherein the cation electrodeposition paint contains 40 to 150 parts by weight based on 100 parts by weight of resin solid.

5. The process according to claim 1, wherein the thin film formed of the cation electrodeposition paint has a water absorption within the range of 0.3–20% by weight.

6. The process according to claim 1, wherein the film formed by the barrier coat has a static glass transition temperature of −30° to −60° C.

7. The process according to claim 6, wherein the static glass transition temperature is −40° to −55° C.

8. The process according to claim 1, wherein the modified polyolefin resin is obtained by graft-polymerizing maleic acid or maleic anhydride onto a polyolefin resin.

9. A process according to claim 8, wherein the modified polyolefin resin is obtained by graft-polymerizing 0.1 to 50 parts by weight of maleic acid or maleic anhydride onto 100 parts by weight of a propyleneethylene copolymer having a propylene:ethylene mole ratio of 40:60 to 80:20.

10. A process according to claim 1, wherein the modified polyolefin resin is a blend of 100 parts by weight of a polyolefin resin and 1 to 90 parts by weight of a chlorinated polyolefin having a chlorination degree of 1 to 60% and a number average molecular weight of 10,000 to 1,000,000.

11. A process according to claim 10, wherein the polyolefin resin is a propylene-ethylene copolymer having a propylene:ethylene mole ratio of 40:60 to 80:20 and the chlorinated polyolefin is a chlorinated polypropylene.

12. The process according to claim 1, wherein the film formed by the barrier coat has an elongation at break of 200 to 1,000% in an atmosphere of −20° C.

13. The process according to claim 12, wherein the elongation at break is 300 to 800% in an atmosphere of −20° C.

14. The process according to claim 1, wherein the corrosion-preventive pigment is that of which aqueous extract has an electroconductivity of at least 100 μv/cm.

15. The process according to claim 1, wherein the barrier coat contains, per 100 parts by weight of the modified polyolefin resin, 1–150 parts by weight of the corrosion-preventive pigment.

16. The process according to claim 1, wherein the corrosion-preventive pigment is selected from the group consisting of zinc chromate, strontium chromate, barium chromate and calcium chromate.

17. The process according to claim 1, wherein the barrier coat is an organic-base paint.

18. The process according to claim 1, wherein the film formed by the barrier coat has a thickness of 1 to 20μ.

19. The process according to claim 1, wherein an intermediate coating paint is applied on the barrier coat before applying the top coat.

20. The process according to claim 19, wherein the intermediate coating paint is a thermosetting intermediate coating paint of an organic solvent-base paint or water-base paint containing, as a chief vehicle component, a combination of (1) a short oil or ultra-short oil alkyd resin having an oil length of 30% or less and/or an oil-free polyester resin and (2) an amino resin.

21. The process according to claim 18, wherein the film formed by the intermediate coating paint has a pencil hardness of 3B to 6H at 20° C.

22. The process according to claim 18, wherein the film formed by the intermediate coating film has a thickness of 10 to 100μ as cured film.

23. The process according to claim 1, wherein the top coating paint is a top coating paint of an alkyl-etherified amino/acrylic resin or an alkyl-etherified amino alkyd resin.

24. The process according to claim 1, wherein the top coating paint is a paint capable of forming an ultra-hard coating film.

25. The process according to claim 24, wherein the ultra-hard coating film has a pencil hardness of 4H to 9H at 20° C. as cured film.

26. The process according to claim 4, wherein the cationic electrodeposition paint contains 55 to 100 parts by weight of pigments based on 100 parts by weight of resin solid.

27. The process according to claim 26, wherein the top coating paint is in powder form.

28. The process according to claim 27, wherein the barrier coat contains a compatible solvent.

29. The process according to claim 26, wherein the barrier coat contains at least one deterioration inhibitor for resins, selected from ultraviolet absorbers, photostabilizers and anti-oxidants.

30. The metallic substrate coated according to the process of claim 1.

* * * * *